United States Patent
Bradshaw et al.

[15] 3,685,940
[45] Aug. 22, 1972

[54] CLAY INJECTION MOLDING MACHINE

[72] Inventors: Arthur Bradshaw; Dennis Podmore, both of Argyle Works, Leek New Rd., Stoke-on-Trent, England

[22] Filed: July 23, 1970

[21] Appl. No.: 57,466

[30] Foreign Application Priority Data

Aug. 2, 1969 Great Britain...........38,815/69
Dec. 27, 1969 Great Britain...........62,995/69
Feb. 25, 1970 Great Britain............9,072/70

[52] U.S. Cl. ..................425/218, 425/258, 425/436, 264/333
[51] Int. Cl. .............................................B28b 1/24
[58] Field of Search..............25/22, 23, 25, 105, 107; 18/DIG. 28; 264/333, 328

[56] References Cited

UNITED STATES PATENTS

| | | |
|---|---|---|
| 2,203,572 | 6/1940 | Johnson..................25/22 UX |
| 2,294,926 | 9/1942 | Miller........................25/22 X |
| 2,875,556 | 3/1959 | Vigna et al.............18/30 HM |
| 2,995,796 | 8/1961 | Wahl et al. ....................25/22 |

FOREIGN PATENTS OR APPLICATIONS

| | | |
|---|---|---|
| 36,858 | 6/1965 | Germany...................425/129 |

*Primary Examiner*—R. Spencer Annear
*Attorney*—W. Bigelow Hall and Richard A. Wise

[57] ABSTRACT

Moist plastic clay is formed in the manufacture of articles of ceramic ware by injecting clay which is in a temporary state of fluidity (fluidized) into a mould cavity. A charge of clay is provided in a chamber and subjected to an impact by an impact plunger which fluidizes the clay and causes it to flow from the chamber into the mould cavity. The mould cavity is provided by a plurality of dies which are thereafter opened to release the article formed therein.

13 Claims, 6 Drawing Figures

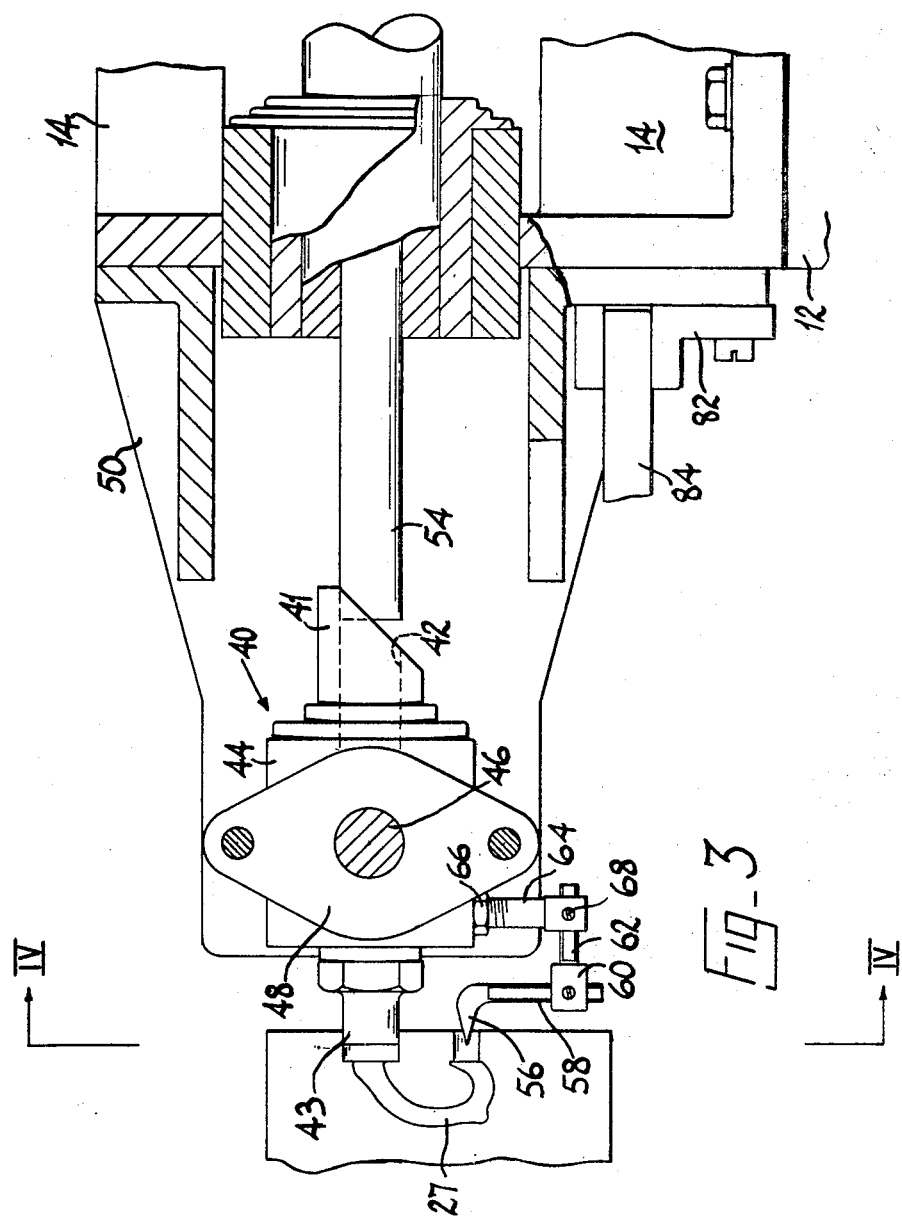
Fig_3

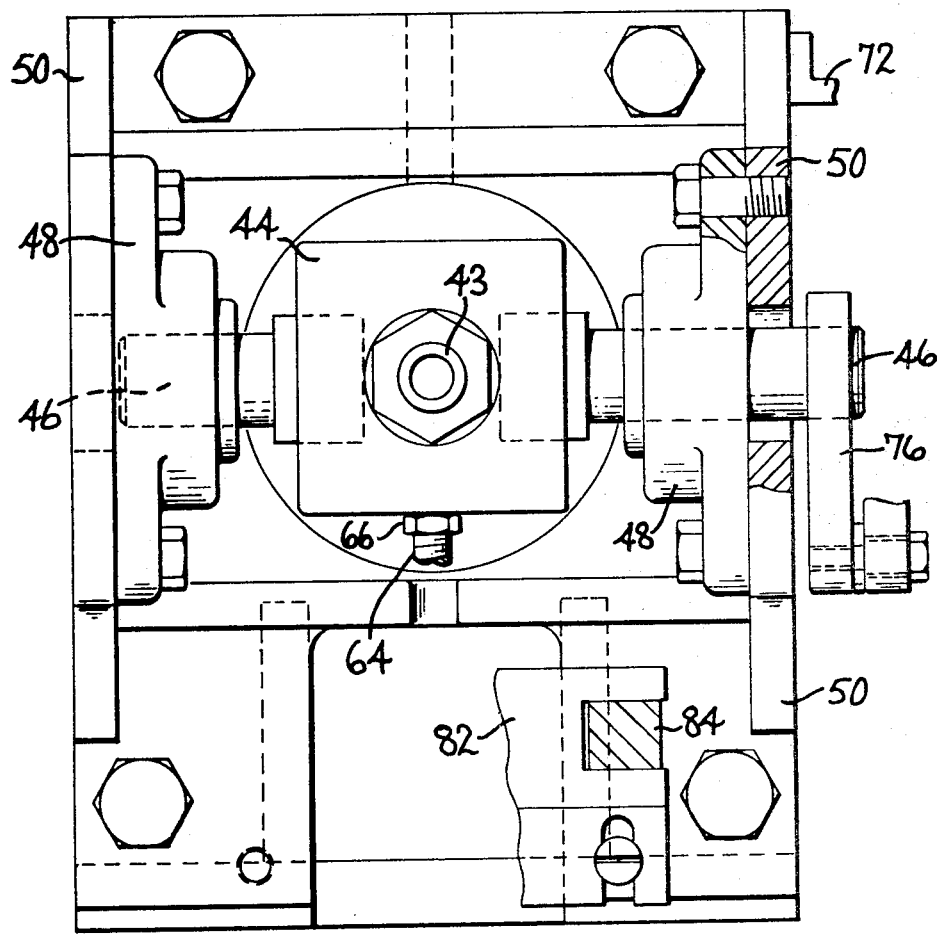
Fig_4

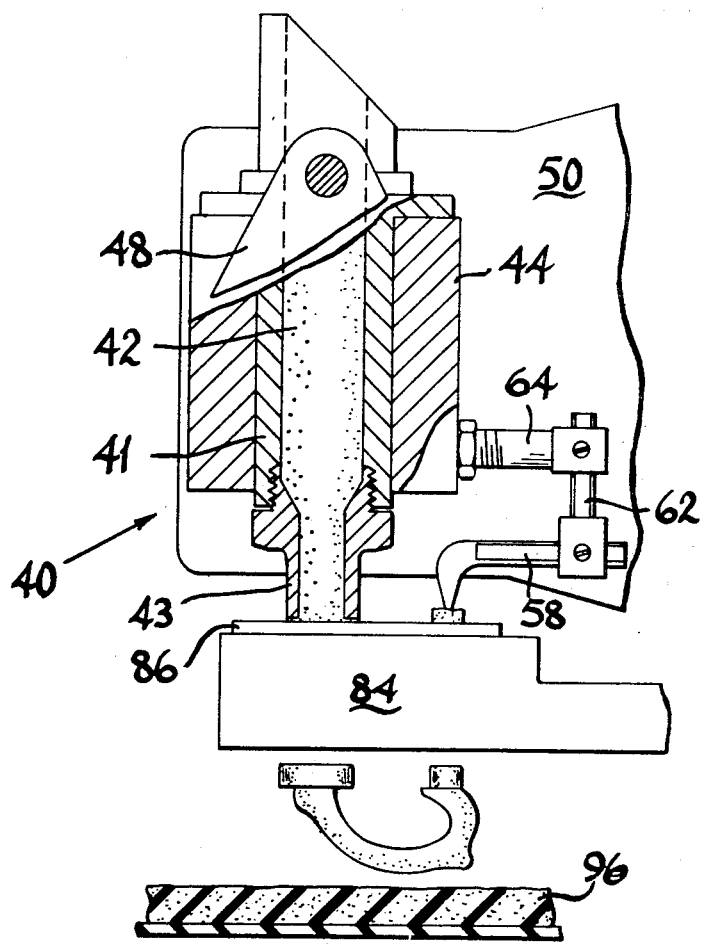
Fig_6

CLAY INJECTION MOLDING MACHINE

BACKGROUND OF THE INVENTION

In the manufacture of ceramic ware, articles of regular shape and circular cross-section, such as plates, saucers, cups and bowls, can conveniently be formed by shaping a lump of moist clay on a rotating mould by means of a profiled shaping tool (which may be in the form of a blade or of a roller). Many articles, however, (especially those of irregular shape) for example cup handles, ceramic insulators and many articles of an ornamental character, do not lend themselves to such forming techniques and are customarily formed by slip casting, in which slip is poured into a porous plaster of Paris mould, or by clay pressing between suitably shaped dies. There have also been proposals, for example as described in U.K. Pat. specification No. 833,360, to form shaped clay pieces, for example cup handles, by injection moulding plastic clay, the clay being forced by an auger through an extrusion orifice into a mould cavity between dies. So far as we are aware, however, such attempts as there have been to injection mould articles from plastic clay having a suitable water content to permit the clay to retain its shape when the dies are opened have failed because of the inability of the clay to flow, the setting up of internal stresses in the clay, excessive abrasion of the dies or because of unacceptable sticking of the clay to the dies when they are opened.

Of the above-mentioned hitherto customary procedures for shaping clay profile shaping, though well suited to forming articles of regular shape and circular cross-section, is limited in application to such regular, circular articles. Slip-casting is a slow process and mainly confined to the making of hollow articles (e.g. teapots) and handles for cups which cannot readily be made by other methods. Clay pressing usually results in a formed article having residual internal stresses which, even if they have not given rise to visible signs of rupture in the clay state, result in the article distorting or cracking on drying and firing.

It is known that moist, plastic, clay can be brought to a temporary state of fluidity by mechanical disturbance, the clay returning to its plastic condition on removal of the disturbance. It has been appreciated that since clay flows readily when fluidized (that is, in its temporary state of fluidity) it should be possible to fill a mould cavity with clay in this state to form a ceramic article; for example, a method of forming a ceramic article is described in U.K. Pat. specification No. 983,184 in which a mass of clay is subjected, while positioned between male and female formers, to pressure and low frequency vibration, which conditions are said to cause the clay to fluidize and flow to fill the space between the formers. However, so far as we are aware, such a proposal did not meet with commercial success.

SUMMARY OF THE INVENTION

In view of the foregoing it is an object of this invention to provide an improved method of forming clay in the manufacture of articles of ceramic ware. It is also an object of this invention to provide an improved machine for use in moulding articles from moist clay by injecting the clay while fluidized.

To these ends, and in accordance with a feature of the invention, a machine for forming clay is provided in which a charge of stiffly plastic moist clay is subjected to an impact to render it temporarily fluid and cause it to flow, while fluid, into a mould cavity thereby to assume a shape defined by the cavity.

According to another feature of the invention a machine is provided which comprises a plurality of dies which in a closed condition define a mould cavity, a chamber which can receive a charge of clay, means for closing the dies and bringing the mould cavity and chamber into communication, means for subjecting a charge of clay in the chamber to an impact so that the clay therein is fluidized and caused to flow into the mould cavity, and means for opening the dies to release the article formed therein. The invention enables articles of ceramic ware to be made reliably and rapidly which are well defined, strong, and free of such stresses as lead to cracking or undesirable distortion on drying and firing.

BRIEF DESCRIPTION OF THE DRAWINGS

The foregoing and other features of the invention will now be more particularly described in connection with an illustrative embodiment and with reference to the accompanying drawings thereof, in which:

FIG. 3 is a view, on a larger scale than FIG. 1, likewise in right-hand side elevation but with parts broken away, of clay-injection means of the illustrative machine;

FIG. 4 is a view in section, with parts broken away, on the line IV — IV of FIG. 3;

FIG. 5 is a fragmentary view in plan of handle cutting means of the illustrative machine; and FIG. 6 is a fragmentary view in elevation of a nozzle portion of the clay-injection means of the illustrative machine shown in a vertical, loading, position immediately after operation of the handle cutting means.

DESCRIPTION OF THE PREFERRED EMBODIMENT

Figure 1:
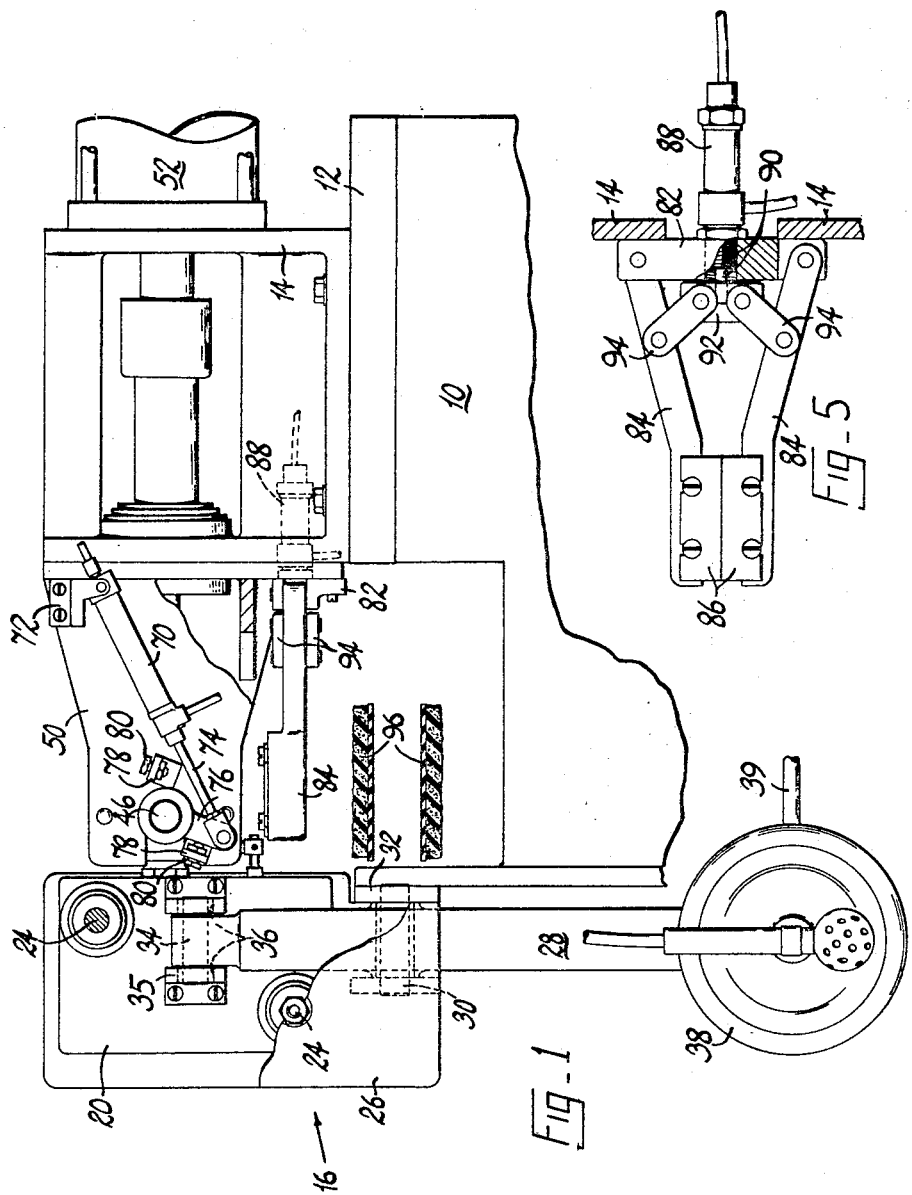
FIG. 1 is a view in right-hand side elevation of an illustrative machine.
Figure 2:
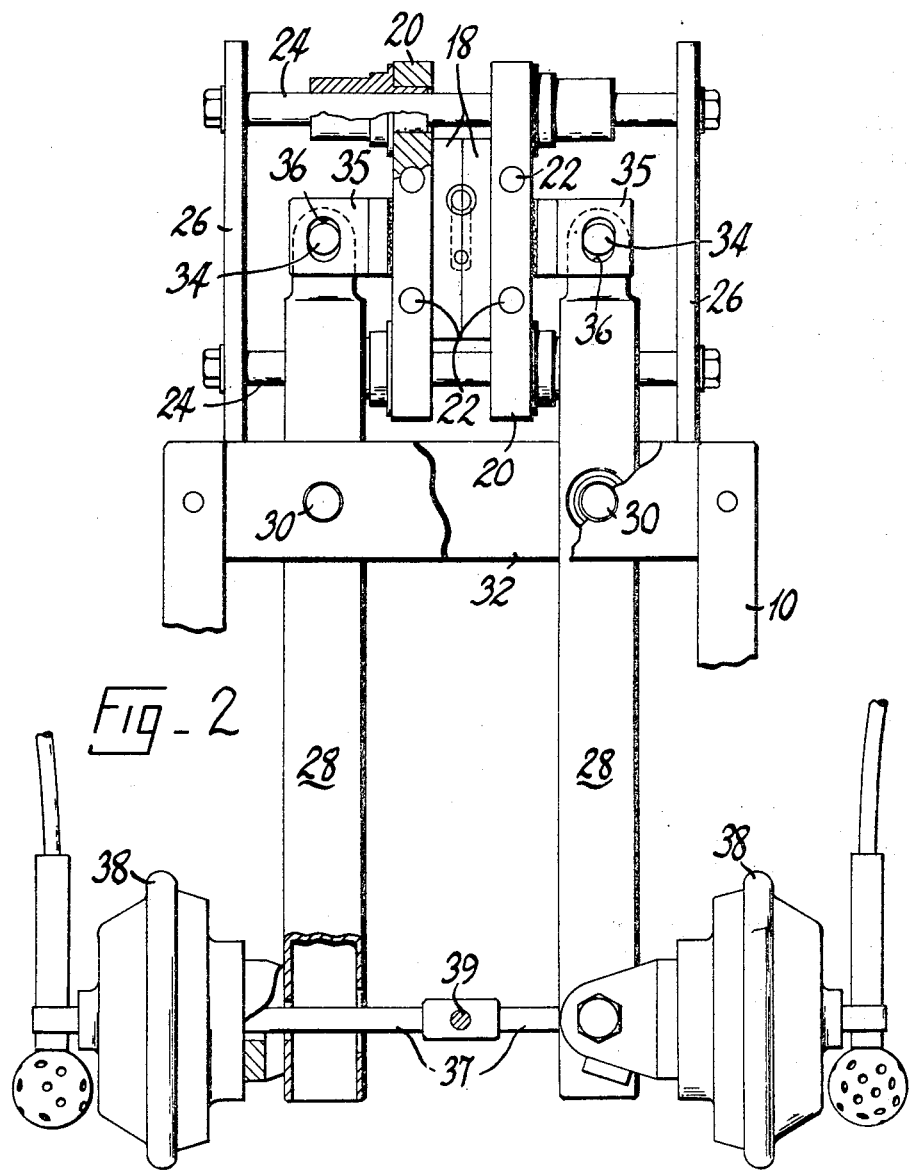
FIG. 2 is a view in front elevation and partly broken away of two dies of the illustrative machine with means for opening and closing them.

The illustrative machine comprises a base 10 (FIG. 1) which stands on the floor and has a horizontal table portion 12 on which a frame 14 of clay-injection means of the machine is bolted. To a front vertical face of the base 10 is bolted a support 16 for a mould which is provided by two dies 18 (FIG. 2). The dies 18 are mounted on die blocks 20 which are arranged to slide on two horizontal bars 24 extending between side walls 26 of the support 16, and means for heating the dies is provided which comprises cartridge heating elements 22.

The dies 18 of the illustrative machine are shown in closed positions in FIG. 2, in which faces of the dies (or raised rims round their cavities) abut one another and the dies define an open-ended mould cavity 27 in the shape of a cup handle as seen in FIG. 3. Die operating means shown in FIG. 2 for opening and closing the dies 18 of the illustrative machine by bringing them out of and into engagement with one another comprises two generally upright levers 28 pivoted at 30 to a cross bar 32 of the support 16, each of the levers 28 having a pin 34 near its upper end which is accommodated in a vertical slot 36 in an ear 35 projecting from one of the die blocks 20. Each lever 28 carries at its lower end one of two diaphragm motors 38. Piston rods 37 of the two motors are connected together by a coupling from which a rod 39 extends rearwardly and is secured to the frame 10. Thus the piston rods 37 and coupling constitute a tie rod between the motors, the rod 39 serving to hold the tie rod in a central position. The arrangement is such that air under pressure admitted to the diaphragm motors is effective through a leverage of 2:1 afforded by the levers to press the dies together with a pressure in the order of 1,200 lbs; release of air pressure behind the diaphragms in the motors allows the dies to open under the influence of return springs (not shown) in the motors.

The clay-injection means of the illustrative machine comprises a nozzle portion 40 (FIGS. 3 and 6) having a cylindrical sleeve 41 which provides a chamber 42, a tubular nozzle piece 43 being detachably screwed into the sleeve 41 at one end. The sleeve 41 is mounted in a bore in a block 44 of the nozzle portion from which it can readily be removed for periodical cleaning. The nozzle portion is mounted on and between coaxially spaced shafts 46 rotatable in bearings 48 (FIG. 4) bolted to forwardly projecting side walls 50 of the frame 14. The nozzle portion 40 is thus mounted to swing about a horizontal axis between a first, horizontal, injecting, position (i.e. a position in which the axis of its chamber 42 is horizontal and an outlet therefrom, provided by the nozzle piece 43, is in communication, when the dies 18 are closed, with an inlet portion of the mould cavity as shown in FIG. 3) and a second, vertical, loading, position in which an open end of the sleeve 41, opposite the one with the nozzle piece on it, is uppermost and a piece of clay can be dropped into the chamber 42 (as shown in FIG. 6).

Behind the nozzle portion 40, the clay-injection means of the illustrative machine comprises a pneumatically operated impact cylinder 52 (FIG. 1), a piston rod of which comprises a plunger 54 (FIG. 3) which is a sliding fit in the chamber 42 of the nozzle portion 40. The sleeve 41 is cut away at one side of its open end so that, when the nozzle portion assumes its injecting position and the plunger 54 is in its retracted position, the sleeve 41 rests, or nearly rests on, the plunger 54, with which it is in coaxial alignment. An operative impact stroke imparted to the plunger results in projection of the plunger into the chamber 42 and extrusion of clay therefrom through the outlet provided by nozzle piece 43. Such clay is fluidized, by the impact and caused to flow, while fluidized into and through the mould cavity 27 and impinge on a forwardly-projecting pointed end portion 56 of a finger 58 (FIG. 3) which projects into an outlet portion of the mould cavity when the dies are closed and constitutes article-retaining means of the illustrative machine. The retaining means serves, together with clay in the nozzle portion, to hold the moulded handle when the dies open. The finger 58 has a flat surface along one side and is secured in adjusted position in a sleeve 60 of an arm 62 by means of a set screw bearing on the flat surface. Upon loosening the screw, the pointed end portion 56 can be moved radially towards and away from the nozzle piece 43. The set screw, bearing on the flat surface of the finger, prevents it rotating in the arm. The arm 62 likewise has a flat sided stem which is received in a sleeve portion of a bracket 64 threaded into the block 44 and secured by a lock nut 66; the arm 62 is adjustable lengthwise in the sleeve portion of the bracket, and fixed in position and prevented from rotating by a set screw 68. Upon loosening the screw 68, the finger 58 can be moved in the direction of the axis of the nozzle piece to align its end portion 56 with the tip of the nozzle piece. Thus the pointed end portion of the finger 58 can be accurately located relative to the nozzle piece 43 and, being also mounted on the block 44, remains so positioned as the nozzle portion 40 rocks about the axis of the shafts 46.

Means for swinging the nozzle portion 40 of the illustrative machine between its injecting and loading positions comprises a pneumatic cylinder 70 (FIG. 1) pivotally mounted on a bracket 72 secured to the frame 14. A piston rod 74 secured to a piston (not shown) of the cylinder 70 is pivoted to an arm 76 secured to one of the shafts 46. On the outside of the right hand one of the walls 50 are mounted two brackets 78 each with an adjustable screw 80 arranged to be engaged by the arm 76 to limit swinging movement of the nozzle portion and determine its two positions.

Handle cutting means of the illustrative machine will now be described. A horizontal, transversely disposed, bracket 82 (FIGS. 1 and 5) is mounted with provision for heightwise adjustment on a front portion of the frame 14 below the side walls 50; the bracket has yoked end portions within each of which a rear end portion of one of two cutter arms 84 is pivoted. Forward end portions of the arms 84 carry cutter blades 86. Secured to the rear of the bracket 82 is a pneumatic cylinder 88 from which a piston rod 90 projects forwardly through the bracket 82. At its forward end, the rod 90 carries a block 92 to which two pairs of links 94 are pivoted, the links being also pivoted in pairs, one pair to each of the arms 84. The arrangement is such that actuation of the cylinder 88 to move the piston rod 90 forwardly, separates the blades 86, and retraction of the rod 90 brings them together. The blades are disposed directly below the axis of the shafts 46, so that, the bracket 82 being suitably positioned heightwise, the nozzle portion can swing into its vertical position while the blades 86 are open, and the blades then brought together to cut off the handle thus presented from the nozzle piece 43 and finger 58. The handle is conveniently allowed to drop on to conveyor means comprising a conveyor belt 96 (FIGS. 1 and 6) which is driven intermittently, one step at each operating cycle, by a pneumatic cylinder (not shown) to carry the handles away to a locality at which they can be picked up, for example by hand, cut and fettled, and stacked, packaged, or attached to cups.

The illustrative machine is provided with a cam shaft timer (not shown) which has a cam shaft arranged to rotate on actuation, at a fixed speed of 12 revolutions per minute. A guard (not shown) by which the operator gains access to the nozzle portion 40 to load it when it is in its vertical position, is arranged to start the cam shaft time when it is closed. The cam shaft of the time has eight cams, each in two adjustable parts to time the closing and opening of an associated switch. The switches energize solenoid valves for the several pneumatic cylinders of the illustrative machine. One cam of the timer causes the guard to be locked by a plunger (not shown) as the cam shaft begins to turn, the cam releasing the plunger as the cam shaft completes one revolution and stops, thus allowing the guard to open under the action of a spring.

After locking of the guard, as the cam shaft of the timer rotates in an operating cycle of the illustrative machine, the following sequence occurs. Commencing with the nozzle portion 40 in its vertical, loading, position (it is as shown in FIG. 6), a piece of stiffly plastic moist clay, preferably of carefully measured volume a little in excess of the volume of the mould cavity 27, is dropped into the chamber 42 provided by the sleeve 41, and air under pressure is admitted to the cylinder 70 behind the piston therein to swing the nozzle portion 40 into its horizontal position (FIG. 3). As the nozzle portion reaches such position, the diaphragm motors 38 are operated to close the dies 18, the mould cavity receiving within its open ends the nozzle piece 43 and the pointed end portion 56 of the finger 58 as indicated in FIG. 3. As the dies 18 complete their movement towards one another, air under pressure is admitted to the impact cylinder, so that, when the dies have closed, the pressure has built up in the cylinder and it operates to deliver a blow to the plunger 54 which is thereupon driven into the chamber 42. Thus the clay in the chamber 42 is subjected to an impact and extruded, fluidized through the nozzle piece 43 and injected into the mould cavity 27, which it fills to assume the shape defined by the cavity. The clay flows through the mould cavity and envelopes the tip of the pointed end portion 56 of the finger 58.

As well as serving to retain a cup handle formed in the operation of the illustrative machine, the finger 58 also serves as means for restricting the passage of clay through the outlet portion of the mould cavity 27 to ensure that the clay injected into the cavity fills the cavity and is well compacted. Adjustment of the position of the finger will thus depend in part upon the amount of restriction it is desired to impose upon the passage of clay from the exit end of the cavity.

Next, in the cycle of operation of the illustrative machine, the plunger 54, is withdrawn and the thrust of the diaphragm motors 38 relieved to open the dies 18, which release a well defined and strong cup handle with its ends retained by the nozzle piece 43 and the pointed end portion 56 of the finger 58.

On retraction of the plunger 54 in the cycle of operation of the illustrative machine, the cylinder 70 is caused to be reversed and the nozzle portion 40 to be pivoted to its vertical position. When the machine is at rest, the cutter blades 86 are open, so the handle is now admitted between them. As the nozzle portion 40 reaches its vertical position, air is admitted in front of the piston in the cylinder 88 to effect a cut-off stroke of the blades 86, whereupon the handle drops on to the conveyor 96. The cylinder 88 is immediately reversed on completion of its stroke to restore the blades 86 to their open positions. The cam shaft of the timer now completes its revolution, releases the guard and stops. The illustrative machine is now ready to receive another piece of clay for the next operating cycle.

The impact to which the plunger 54 is subjected in the operation of the illustrative machine is variable by varying the pressure of air supplied to the impact cylinder. For example, where the clay body is a fairly hard earthenware one of from one to two ounces in weight and has a moisture content of 18.5 to 19.5 percent (based on the weight of the clay as a whole), air pressure at 70 p.s.i. applied to a 4 inch diameter impact cylinder designed to deliver at such pressure a blow of about 6,000 pounds results in a stiff compacted handle. A suitable temperature for the dies, which may be of an aluminum alloy, coated to improve wear resistance, is 150°–175° C for such an earthenware body; a rather lower temperature would be necessary for a china body, for example. Following injection of the clay into the mould cavity, quick release of pressure behind the plunger 54 and immediate opening of the dies (preferably within 1 or 2 seconds of injection) ensures release of the clay from the die surfaces.

It has been found desirable that for some clay bodies the dies of the illustrative machine be lubricated between each handle moulding-operation. For this purpose, the block 44 may carry two air tubes one above the other, which, when the nozzle portion is in its vertical position, are in register with the inlet and outlet portions respectively of the mould cavity of the closed dies. The dies are therefore caused to close and open a second time in the operating cycle of the machine (under the control of one of the cams of the timer) after the nozzle portion has returned to its vertical position, and while they are closed oil-laden air is blown in through the upper tube and out through the lower one, leaving a film of oil over the faces of the mould cavity.

Instead of the finger 58 with the pointed end portion 56, the illustrative machine may be provided with a short tube adjustably positioned in the sleeve portion 60 of the arm 62, into which the excess clay will flow in the moulding operation. Such a tube may have an opening clear of the dies at one side and a screw threaded into it from the end remote from the dies, thus partially to obstruct the opening, and consequently the freedom of the clay to escape, the screw being adjustable to vary the restriction. Thus the tube serves the same function as the finger 58, viz to retain one end of the handle when the dies open and to restrict the passage of clay through the outlet portion of the mould cavity.

Whereas the illustrative machine has been described with handle cut-off means provided by the two blades 86, it may be preferred alternatively merely to provide a straight blade which is caused to approach the handle from one side, travelling at right-angles to its length, and simultaneously sever the two ends of the handle, allowing it to drop on to the conveyor.

A cam (not shown) mounted on one of the shafts 46 outside the left-hand side wall 50 of the frame 14 to swing with the block 44 of the nozzle portion of the illustrative machine is arranged to engage and close a safety switch when the nozzle portion is in its horizontal position. The switch is arranged in series with the solenoid valve which actuates the impact cylinder 52 so that the plunger 54 cannot be thrust forward unless the sleeve 41 is in position to receive it.

Cup handles made in the operation of the illustrative machine from plastic clay are well defined, accurately reproducing the shape of the mould cavity, strong, and free of such stresses as lead to cracking or undesirable distortion on firing.

Various means may be selected for providing a blow to impact the clay in carrying out a method in accordance with the invention. Where the force and its rate of application are sufficient a pneumatic impact cylinder is preferred to move a plunger in an extrusion chamber though, alternatively, explosive means or other mechanical means may be used; for example, when a small quantity of clay, for a cup handle, perhaps, is to be moulded, a heavy spring which can be suddenly released from compression might be used.

Whereas the illustrative machine is described as being fed by hand, a machine according to the invention, otherwise similar to the illustrative machine, may be provided with means for automatically supplying measured quantities of clay into the chamber of the nozzle portion when it swings to its loading position.

Having thus described our invention, what we claim as new and desire to secure by Letters Patent of the United States is:

1. A machine for use in forming moist clay in making an article of ceramic ware comprising a plurality of relatively movable dies which in a closed condition define a mould cavity having an inlet through which clay in a fluid condition can be injected, a chamber having an outlet and adapted to receive a charge of clay, means for closing the dies, means operatively connected to the chamber for moving the outlet from the chamber into a position to communicate with the inlet to the mold cavity, means for subjecting a charge of clay in the chamber to an impact so that clay thereby fluidized flows through the outlet into the mould cavity, and means for opening the dies to release the article formed therein.

2. A machine according to claim 1 in which there is also provided an outlet from the mould cavity, and in which article-retaining means is provided at the outlet when the dies are closed and clay is being injected thereinto in the operation of the machine whereby to restrict passage of clay through the outlet and to provide support for the article when the dies are opened.

3. A machine according to claim 2 in which the position of the article-retaining means at the outlet from the mould cavity is adjustable so that the restriction on the passage of clay through the outlet can be varied.

4. A machine according to claim 2 in which the dies define an open-ended mould cavity for a cup handle, the article-retaining means being mounted adjacent the chamber so that on opening of the dies in the operation of the machine the handle is supported at one end by the clay in the outlet from the chamber and at the other by the article-retaining means.

5. A machine according to claim 4 and additionally comprising cutting means, for severing the clay adjacent the chamber and retaining means, to separate the handle therefrom after the dies have opened.

6. A machine according to claim 5 comprising conveyor means on to which the separated handle falls upon operation of the cutting means.

7. A machine according to claim 1 in which the chamber has a nozzle portion mounted for movement between an injecting position, in which it is aligned with the impact cylinder and in which clay is extruded from it into the mould cavity, and a loading position, out of alignment with the cylinder, in which it can receive a charge of clay.

8. A machine according to claim 7 wherein the chamber outlet moving means comprises means for moving the nozzle portion between its injecting and loading positions.

9. A machine according to claim 7 in which the nozzle portion is pivoted to swing between the injecting and loading positions.

10. A machine according to claim 9 in which an axis of the impact cylinder, in the direction of which the plunger is driven in the operation of the machine, is horizontal and in which an axis of the nozzle portion which lies along said axis of the impact cylinder when the nozzle portion is in its injecting position is vertical when the nozzle portion is in its loading position.

11. A machine according to claim 2 and additionally comprising a nozzle portion of the chamber mounted for movement from an injecting position to a loading position, the article-retaining means being mounted for movement as a unit with the nozzle portion.

12. A machine for use in the manufacture of articles of ceramic ware comprising a plurality of dies which together provide a mould cavity (e.g. in the shape of a cup handle), means for bringing the dies into and out of engagement with one another, clay-injection means comprising an impact cylinder and a plunger slidably received in a chamber which, in the operation of the machine, is in communication with an inlet of the mould cavity, and article-retaining means arranged to project into an outlet of the mould cavity, the construction and arrangement being such that in the operation of the machine the impact cylinder is actuated to drive the plunger into the chamber to force clay by impact from the chamber into the mould cavity to fill the cavity with clay, passage of clay through the outlet of the cavity being restricted by the article-retaining means and a handle being retained thereby on opening of the dies.

13. A machine for use in the manufacture of articles of ceramic ware comprising a plurality of dies, which together provide a mould cavity (e.g. in the shape of a cup handle), means for bringing the dies into and out of engagement with one another, and clay-injection means comprising a plunger, means for effecting an operative stroke of the plunger under impact, a nozzle portion which, in the operation of the machine is in communication with an inlet of the mould cavity and injects clay thereinto under the impact of the plunger, and means for moving the nozzle portion between its injecting position, in which clay is extruded from it into the mould cavity, and a loading position in which it can receive a charge of clay.

* * * * *

FO-1050
(5/69)

UNITED STATES PATENT OFFICE
CERTIFICATE OF CORRECTION

Patent No. 3,685,940            Dated August 22, 1972

Inventor(s) Arthur Bradshaw ; Dennis Podmore

It is certified that error appears in the above-identified patent and that said Letters Patent are hereby corrected as shown below:

On title page after Inventors, insert - Assignee:

Service (Engineers) Limited, Staffordshire, England-

Signed and sealed this 6th day of February 1973.

(SEAL)
Attest:

EDWARD M. FLETCHER, JR.
Attesting Officer

ROBERT GOTTSCHALK
Commissioner of Patents